US009692534B2

(12) United States Patent
Jones (10) Patent No.: US 9,692,534 B2
(45) Date of Patent: Jun. 27, 2017

(54) CELLULAR COMMUNICATION SYSTEM, COMMUNICATION UNITS, AND METHOD FOR BROADCAST AND UNICAST COMMUNICATION

(75) Inventor: Alan Edward Jones, Caine (GB)

(73) Assignee: SCA IPLA Holdings Inc., New York, NY (US)

( * ) Notice: Subject to any disclaimer, the term of this patent is extended or adjusted under 35 U.S.C. 154(b) by 204 days.

(21) Appl. No.: 13/810,471

(22) PCT Filed: Jul. 20, 2011

(86) PCT No.: PCT/GB2011/051375
§ 371 (c)(1),
(2), (4) Date: Jan. 16, 2013

(87) PCT Pub. No.: WO2012/010895
PCT Pub. Date: Jan. 26, 2012

(65) Prior Publication Data
US 2013/0114581 A1    May 9, 2013

(30) Foreign Application Priority Data

Jul. 23, 2010    (GB) .................................. 1012362.8

(51) Int. Cl.
*H04J 3/00*    (2006.01)
*H04H 20/71*    (2008.01)
(Continued)

(52) U.S. Cl.
CPC .......... *H04H 20/71* (2013.01); *H04W 72/005* (2013.01); *H04W 4/06* (2013.01); *H04W 72/04* (2013.01)

(58) Field of Classification Search
CPC ............. H04W 72/0446; H04W 72/04; H04W 72/042; H04W 72/0413; H04W 74/0833;
(Continued)

(56) References Cited

U.S. PATENT DOCUMENTS

2007/0064669 A1*  3/2007  Classon ................ H04L 1/1822
                                                    370/347
2008/0056256 A1*  3/2008  Cinghita ............. H04L 12/1836
                                                    370/390
(Continued)

FOREIGN PATENT DOCUMENTS

CN          101356779 A        1/2009
EP          1 852 997          11/2007
(Continued)

OTHER PUBLICATIONS

3GPP TSG RAN WG1#44 R1-060372, "Multiplexing of Unicast Pilot and Control Channels in E-MBMS for EUTRA Downlink", Texas Instruments, Total 2 Pages, (Feb. 13-17, 2006) XP 50101318.
(Continued)

*Primary Examiner* — Andrew Chriss
*Assistant Examiner* — Atique Ahmed
(74) *Attorney, Agent, or Firm* — Oblon, McClelland, Maier & Neustadt, L.L.P.

(57) ABSTRACT

A method and apparatus supporting broadcast and unicast transmissions in a wireless communication system including plural communication cells. A first method includes: supporting one broadcast transmission in one sub-frame of a physical resource; the one broadcast transmission includes broadcast data using a first cell identifier and supporting transmission of unicast control information using a second cell identifier in the one sub-frame of the physical resource, the first and second cell identifiers being different. A second method includes: supporting one time discontinuous broadcast transmission in one sub-frame of a radio frame of a physical resource; and supporting transmission of unicast control information in plural time-continuous sub-frames of the radio frame of the physical resource; the one sub-frame used for the one time discontinuous broadcast transmission including a first duration less than a second duration used in
(Continued)

the plural sub-frames of the radio frame for transmitting unicast control information.

23 Claims, 5 Drawing Sheets (51) Int. Cl.
*H04W 72/00* (2009.01)
*H04W 4/06* (2009.01)
*H04W 72/04* (2009.01)

(58) Field of Classification Search
CPC ... H04W 4/06; H04W 72/005; H04W 76/002; H04W 4/08; H04W 24/08; H04W 24/10; H04W 24/02; H04W 24/00; H04W 84/12; H04L 5/0053; H04L 5/0037; H04L 12/189
USPC .................................. 370/336, 312, 252, 315
See application file for complete search history.

(56) References Cited

U.S. PATENT DOCUMENTS

| | | | |
|---|---|---|---|
| 2009/0059790 A1* | 3/2009 | Calvert et al. | 370/235 |
| 2009/0132675 A1* | 5/2009 | Horn | H04W 8/26 709/207 |
| 2009/0175179 A1* | 7/2009 | Stewart | H04L 27/2647 370/252 |
| 2009/0196165 A1 | 8/2009 | Morimoto et al. | |
| 2009/0207771 A1* | 8/2009 | Lindskog | H04L 12/1868 370/312 |
| 2009/0252077 A1* | 10/2009 | Khandekar | H04W 72/082 370/312 |
| 2009/0316614 A1* | 12/2009 | Kim | H04B 7/2615 370/312 |
| 2010/0002617 A1 | 1/2010 | Seyama | |
| 2010/0014505 A1 | 1/2010 | Wang et al. | |
| 2010/0080139 A1* | 4/2010 | Palanki | H04B 7/2606 370/252 |
| 2010/0310025 A1 | 12/2010 | Morimoto et al. | |
| 2011/0019659 A1 | 1/2011 | Wang et al. | |
| 2011/0235613 A1 | 9/2011 | Ponnampalam et al. | |
| 2012/0122455 A1* | 5/2012 | Frenger | H04L 5/0037 455/436 |
| 2013/0329624 A1 | 12/2013 | Seyama | |

FOREIGN PATENT DOCUMENTS

| | | |
|---|---|---|
| EP | 2 015 487 | 1/2009 |
| EP | 2 107 820 | 10/2009 |
| EP | 2 139 250 | 12/2009 |
| JP | 2009-516972 | 4/2009 |
| WO | WO 2008/117335 A1 | 10/2008 |
| WO | 2010 046490 | 4/2010 |

OTHER PUBLICATIONS

TSG-RAN WG1 LTE Ad hoc meeting R1-060158, "Unicast/multicast multiplexing for downlink OFDM", Panasonic, Total 4 Pages, (Jan. 23-25, 2006) XP 50417516.

3GPP RAN WG1 LTE ad hoc meeting R1-060074, "Multiplexing of Broadcast and Unicast Traffic", Samsung, Total 5 Pages, (Jan. 23-25, 2006) XP 50417453.

3GPP TSG-RAN WG1 LTE Ad Hoc Meeting R1-060035, "MBMS Channel Structure for E-UTRA Downlink", NTT Docomo, NEC, Sharp, Total 4 Pages, (Jan. 23-25, 2006) XP 003016964.

International Search Report Issued Nov. 30, 2011 in PCT/GB11/051375 Filed Jul. 20, 2011.

Japanese Office Action mailed on Mar. 24, 2015 in Application No. 2013-521216 (3 pages).

Japanese Office Action issued Nov. 24, 2015 in Patent Application No. 2013-521216 (without English Translation).

"3rd Generation Partnership Project, Technical Specification Group Radio Access Network; Introduction of the Multimedia Broadcast/Multicast Service (MBMS) in the Radio Access Network (RAN); Stage 2 (Release 9)", 3GPP TS 25.346 V9.1.0 Mar. 2010, 4 pages.

Chinese Office Action issued Jun. 12, 2015, in Application 201180035948.5 (3 pages).

* cited by examiner

FIG. 7

CELLULAR COMMUNICATION SYSTEM, COMMUNICATION UNITS, AND METHOD FOR BROADCAST AND UNICAST COMMUNICATION

FIELD OF THE INVENTION

The field of the invention relates to utilisation of communication resources in cellular communication systems and in particular, but not exclusively, to supporting broadcast communication in a time-division duplex (TDD) or frequency division duplex (FDD) $3^{rd}$ Generation Partnership Project (3GPP™) cellular communication system.

BACKGROUND OF THE INVENTION

Currently, 3rd generation cellular communication systems are being installed to further enhance the communication services provided to mobile phone users. The most widely adopted 3rd generation communication systems are based on Code Division Multiple Access (CDMA) and Frequency Division Duplex (FDD) or Time Division Duplex (TDD) technology. In CDMA systems, user separation is obtained by allocating different spreading and/or scrambling codes to different users on the same carrier frequency and in the same time intervals. This is in contrast to time division multiple access (TDMA) systems, where user separation is achieved by assigning different time slots to different users.

In TDD systems, the same carrier frequency is used for both uplink transmissions, i.e. transmissions from the mobile wireless communication unit (often referred to as wireless subscriber communication unit) to the communication infrastructure via a wireless serving base station and downlink transmissions, i.e. transmissions from the communication infrastructure to the mobile wireless communication unit via a serving base station. In TDD, the carrier frequency is subdivided in the time domain into a series of timeslots. The single carrier frequency is assigned to uplink transmissions during some timeslots and to downlink transmissions during other timeslots. In FDD systems, a pair of separated carrier frequencies is used for respective uplink and downlink transmissions. An example of communication systems using these principles is the Universal Mobile Telecommunication System (UMTS™). Further description of CDMA, and specifically of the Wideband CDMA (WCDMA) mode of UMTS™, can be found in 'WCDMA for UMTS', Harri Holma (editor), Antti Toskala (Editor), Wiley & Sons, 2001, ISBN 0471486876.

In a conventional cellular system, cells in close proximity to each other are allocated non-overlapping transmission resources. For example, in a CDMA network, cells within close proximity to each other are allocated distinct spreading codes (to be used in both the uplink direction and the downlink direction). This may be achieved by, for example, by employing the same spreading codes at each cell, but a different cell specific scrambling code. The combination of these leads to effectively distinct spreading codes at each cell.

Figure 1:
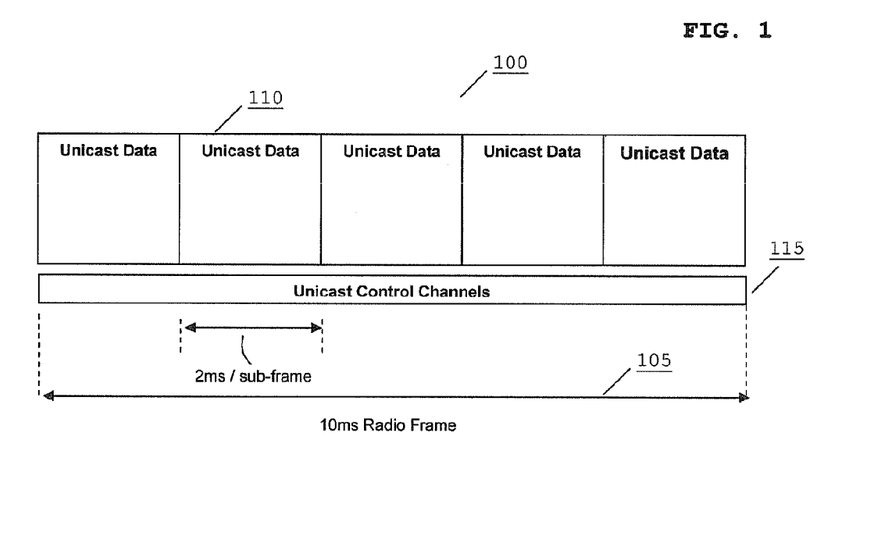
FIG. 1 illustrates a known WCDMA (FDD) HSDPA radio framing/timing structure.

FIG. 1 illustrates a known WCDMA (FDD) HSDPA radio framing/timing structure 100. The HSDPA radio framing/timing structure 100 has a 10 msec radio frame 105 comprising five*2 msec sub-frame periods. Each of the five*2 msec sub-frame periods is used to carry unicast data 110 and unicast control information on unicast control channels 115. As such, a single (unicast) scrambling code is used for the transmission of unicast data and control on the same physical resource.

In order to provide enhanced communication services, the 3rd generation cellular communication systems are designed to support a variety of different and enhanced services. One such enhanced service is multimedia services. The demand for multimedia services that can be received via mobile phones and other handheld devices is set to grow rapidly over the next few years. Multimedia services, due to the nature of the data content that is to be communicated, require a high bandwidth.

Typically, a wireless subscriber unit is 'connected' to one wireless serving communication unit, i.e. one cell. Other cells in the network typically generate interfering signals to the wireless subscriber unit of interest. Due to the presence of these interfering signals a degradation of the maximum achievable data rate, which can be maintained to the wireless subscriber unit, is typical.

The typical and most cost-effective approach in the provision of multimedia services is to 'broadcast' the multimedia signals, as opposed to sending the multimedia signals in an unicast (i.e. point-to-point) manner. Typically, tens of channels carrying say, news, movies, sports, etc., may be broadcast simultaneously over a communication network.

As radio spectrum is at a premium, spectrally efficient transmission techniques are required in order to provide users with as many broadcast services as possible, thereby providing mobile phone users (subscribers) with the widest choice of services. It is known that broadcast services may be carried over cellular networks, in a similar manner to conventional terrestrial Television/Radio transmissions.

Technologies for delivering multimedia broadcast services over cellular systems, such as the Mobile Broadcast and Multicast Service (MBMS) for UMTS™, have been developed over the past few years. In these broadcast cellular systems, the same broadcast signal is transmitted over non-overlapping physical resources on adjacent cells within a conventional cellular system. Consequently, at the wireless subscriber unit, the receiver must be able to detect the broadcast signal from the cell it is connected to. Notably, this detection needs to be made in the presence of additional, potentially interfering broadcast signals, transmitted on the non-overlapping physical resources of adjacent cells.

To improve spectral efficiency, broadcast solutions have also been developed for cellular systems in which the same broadcast signal is transmitted by multiple cells but using the same (i.e. overlapping) physical resources. In these systems, cells do not cause interference to each other as the transmissions are arranged to be substantially time-coincident, and hence capacity is improved for broadcast services. Such systems are sometimes referred to as 'Single Frequency Networks', or 'SFNs'. In SFN systems, a common cell identifier (ID) is used to indicate those (common) cells that are to broadcast the same content at the same time. In the context of the present description, the term "common cell identifier" encompasses any mechanism for specifying SFN operation, which may in some examples encompass use of, say, a single scrambling code.

Broadcast solutions that are based on WCDMA MBMS technology tend to use long spreading codes and are associated with long transmission times per service or data block or even continuous transmission. This is a sub-optimal approach from a user device perspective, since the receiver needs to be in an 'ON' state for a large fraction of time, or even always in an 'ON' state. This can have detrimental impact in terms of viewing times for Mobile TV and other broadcast related services. The long or continuous transmission times per service demand that multiplexing of multiple services on the same carrier must be performed in the code domain.

In the field of broadcast communication, integrated mobile broadcast (IMB) is a standardised part of the 3GPP™ Release 8, and is ideally suited to address a growing market need for a global broadcast solution for mobile devices. IMB harmonises elements of existing 3GPP™ Release 7 WCDMA and TD-CDMA standards to achieve a unified solution incorporating the best technologies from both. IMB utilises a dedicated frequency carrier to support mobile broadcast and is an overlay network operating on a separate carrier to unicast traffic. Thus, IMB allows simultaneous operation of both broadcast and unicast traffic on two separate carriers. IMB can also be used in standalone operation, i.e. without an associated unicast carrier.

Figure 2:
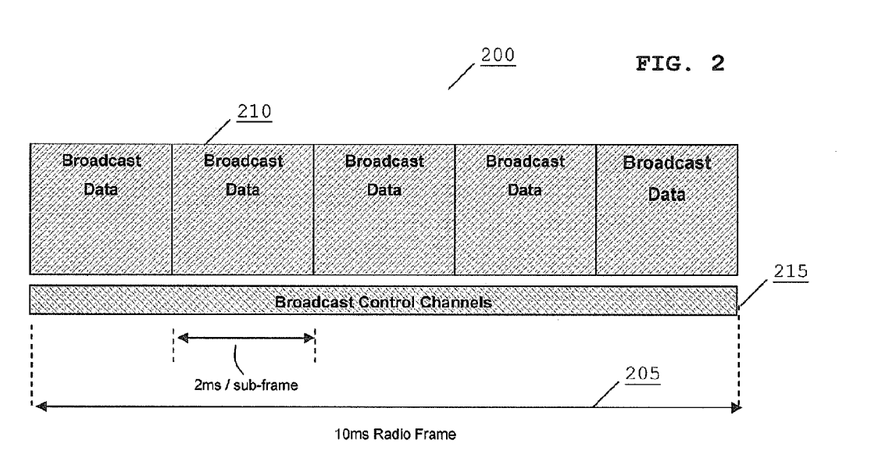
FIG. 2 illustrates a known integrated mobile broadcast (IMB) radio framing/timing structure.

FIG. 2 illustrates a known IMB radio framing/timing structure 200. The IMB radio framing/timing structure 200 also has a 10 msec radio frame 205 comprising five*2 msec sub-frame periods. Each of the five*2 msec sub-frame periods is used to carry broadcast data 210 and broadcast control information on broadcast control channels 215. As such, a single (broadcast) scrambling code (or common cell identifier) is used for the transmission of broadcast data and control on the same physical resource.

For mobile operators that have unpaired spectrum that can be dedicated to broadcast transmissions, IMB provides an excellent solution, since all of the radio frame can be configured for broadcast transmissions. For mobile operators that only have paired unicast spectrum and do not have unpaired spectrum, deployment of IMB services is not possible. One option for these operators is to multiplex the IMB waveform with the unicast transmissions. However, the notion of a Common cell identifier when combined with unicast data does not exist, since the unicast data needs to be unique, on a per cell basis.

Consequently, current techniques are suboptimal. Hence, an improved mechanism to address the problem of supporting broadcast transmissions on a unicast carrier over a cellular network would be advantageous.

SUMMARY OF THE INVENTION

Accordingly, the invention seeks to mitigate, alleviate or eliminate one or more of the abovementioned disadvantages singly or in any combination.

According to aspects of the invention, there is provided, a cellular communication system, methods of operation, integrated circuits and communication units adapted to implement the concepts herein described, as detailed in the appended Claims.

These and other aspects, features and advantages of the invention will be apparent from, and elucidated with reference to, the embodiment(s) described hereinafter.

BRIEF DESCRIPTION OF THE DRAWINGS

Embodiments of the invention will be described, by way of example only, with reference to the accompanying drawings, in which.

DETAILED DESCRIPTION OF EMBODIMENTS OF THE INVENTION

The following description focuses on embodiments of the invention applicable to a UMTS™ (Universal Mobile Telecommunication System) cellular communication system and in particular to a UMTS™ Terrestrial Radio Access Network (UTRAN) operating in any unpaired spectrum within a $3^{rd}$ generation partnership project (3GPP™) system. However, it will be appreciated that the invention is not limited to this particular cellular communication system, but may be applied to any broadcast-supporting cellular communication system.

Figure 3:
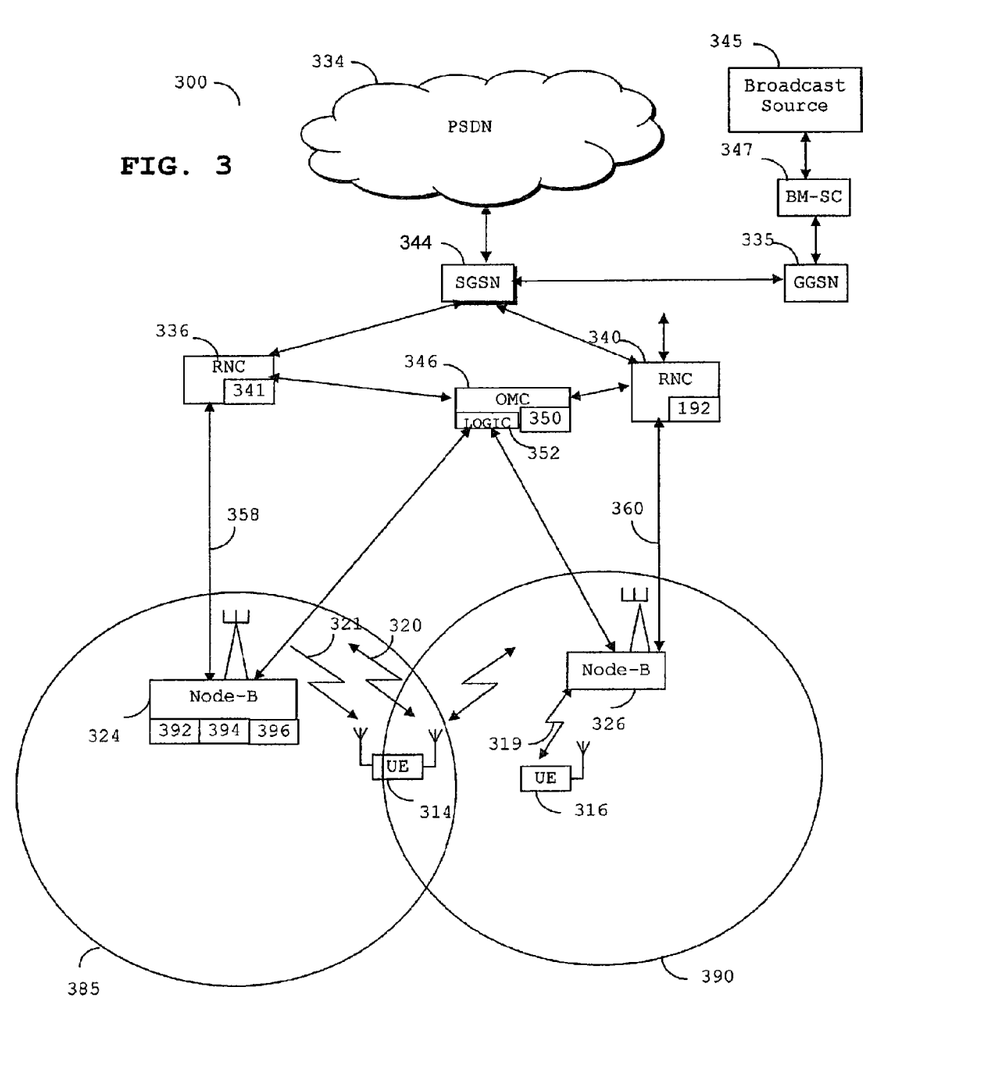
FIG. 3 illustrates a 3GPP™ cellular communication system adapted in accordance with some example embodiments of the present invention.

Referring now to FIG. 3, a cellular-based communication system 300 is shown in outline, in accordance with an example embodiment of the invention. In this example embodiment, the cellular-based communication system 300 is compliant with, and contains network elements capable of operating over, an universal mobile telecommunication system (UMTS™) air-interface. In particular, the example embodiment relates to the Third Generation Partnership Project (3GPP™) specification for wide-band code-division multiple access (WCDMA), time-division code-division multiple access (TD-CDMA) and time-division synchronous code-division multiple access (TD-SCDMA) standard relating to the UTRAN radio interface (described in the 3GPP TS 25.xxx series of specifications). In particular, the example embodiment of the 3GPP™ system is adapted to support both broadcast and unicast UTRA communication in one or more communication cells.

In a unicast mode of operation, a plurality of wireless subscriber communication units/terminals (or user equipment (UE) in UMTS™ nomenclature) 314, 316 communicate, for example in a bi-directional manner, over radio links 319, 320 with a plurality of base stations/base transceiver stations, referred to under UMTS™ terminology as Node-Bs, 324, 326. The cellular communication system comprises many other UEs and Node-Bs, which for clarity purposes are not shown. The cellular communication system, sometimes referred to as a Network Operator's Network Domain, is connected to an external network, for example the Internet. The Network Operator's Network Domain includes: (i) A core network, namely at least one Gateway General Packet Radio System (GPRS) Support Node (GGSN) 335 and at least one Serving GPRS Support Nodes (SGSN) 344; and (ii) An access network. The access network comprises: a plurality of UMTS Radio network controllers (RNCs) 336, 340; operably coupled to a plurality of UMTS Node-Bs 324, 326. The GGSN 335 or SGSN 344 is responsible for UMTS interfacing with a Public network, for example a Public Switched Data Network (PSDN) (such as the Internet) 334 or a Public Switched Telephone Network (PSTN). The SGSN 344 performs a routing and tunnelling function for traffic, whilst a GGSN 335 links to external packet networks. The Node-Bs 324, 326 are connected to external networks, through RNCs 336, 340 and mobile switching centres (MSCs), such as SGSN 344. A cellular communication system will typically have a large number of such infrastructure elements where, for clarity purposes, only a limited number are shown in FIG. 3. Each Node-B 324, 326 contains one or more wireless transceiver units and communicates with the rest of the cell-based system infrastructure via an $I_{ub}$ interface, as defined in the UMTS specification.

Each RNC 336, 340 may control one or more Node-Bs 324, 326. In the illustrated example, Node-B 324 supports both broadcast (e.g. uni-directional) 321 and unicast (e.g. bi-directional) 320 communication over geographic area 385 and Node-B 326 supports communication over geographic area 390. As illustrated, Node-B 324 comprises a transmitter 394 that is operably coupled to a signal processor module 396 and a timer 392. Embodiments of the invention utilize the signal processor module 396 and timer 392 to configure data packet transmissions from the Node-B 326 in both a broadcast mode of operation and a unicast mode of operation. In supporting IMB, the signal processor module 396 is arranged to support broadcast traffic, not on a dedicated separate carrier frequency as is presently the case, but using the same carrier frequency that supports unicast communication. IMB signals may be transmitted from the same or similar equipment as the WCDMA unicast, on the same site and connected to the same core network. The broadcast traffic uses characteristics associated with SFN combining, such as in one example a use of a common cell identifier (ID) and a single spreading code, whereas the unicast control uses an alternative unicast cell-specific ID.

Each SGSN 344 provides a gateway to the external network 334. The Operations and Management Centre (OMC) 346 is operably connected to RNCs 336, 340 and Node-Bs 324, 326. The OMC 346 comprises processing functions (not shown) and logic functionality 352 in order to administer and manage sections of the cellular communication system 300, as is understood by those skilled in the art.

In a broadcast mode of operation, FIG. 3 also illustrates a simplified example of an architecture for providing broadcast (e.g. uni-directional) services on a 3GPP network, for example a Mobile Broadcast and Multicast Service (MBMS). MBMS is a broadcasting and multicasting service offered over mobile telecommunications networks, such as General Packet Radio System (GPRS) networks, Universal Mobile Telecommunication System (UMTS™) networks, Evolved Packet System (EPS), and the like. The technical specifications for MBMS include 3GPP™ TS 22.146, 3GPP TS 23.246 and 3GPP TS 26.346. A plurality of wireless subscriber communication units/terminals (or user equipment (UE) in UMTS™ nomenclature) 314, receive broadcast transmissions over radio link 321 from at least one of a plurality of base transceiver stations, illustrated only as Node-B 326 for simplicity purposes. In the broadcast mode of operation RNC 340 configures the physical resources of the individual Node B 326 for the multimedia services and provides the data to Node B 326 ready for transmission.

A single SGSN 344 can be operably coupled to a single RNC 340, or a single SGSN 344 can be operably coupled to multiple RNCs 336, 340, as shown. The SGSN 344 allocates the necessary resources within the RNCs 336, 340 that are responsible for communication within individual cells (supported by respective NodeBs 324, 326). In a broadcast mode of operation, the SGSN 344 forwards the multimedia data streams for the services to the RNC 336 and thereon to Node B 324.

Figure 5:
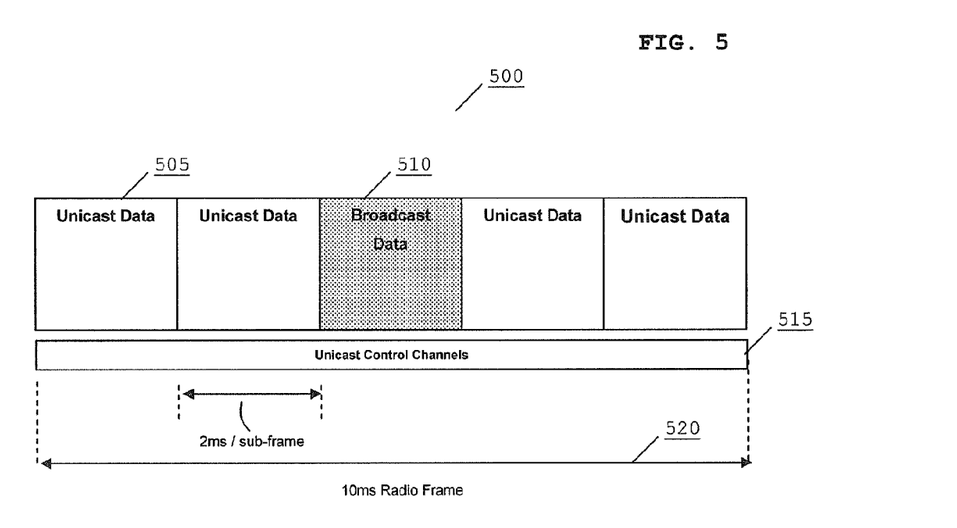
FIG. 5 illustrates a radio framing/timing structure in accordance with some example embodiments of the invention.

In one example embodiment, RNC 336 comprises radio resource management (RRM) logic 341. RRM logic 341 is arranged to insert broadcast traffic into a radio sub-frame allocated for unicast data, such that the broadcast data is sent with unicast control information, as illustrated in FIG. 5. In an alternative example, RRM logic 341 may instruct NodeB 324 to insert broadcast traffic into a radio sub-frame allocated for unicast data, such that the broadcast data is sent with unicast control information, as illustrated in FIG. 5.

In supporting IMB broadcast content, the signal processor module 396 of NodeB 324, or RRM logic 341 of RNC 336, may be arranged in one example to support broadcast traffic not on a dedicated separate carrier frequency as is presently the case, but using the same FDD downlink carrier frequency that supports unicast communication.

The GGSN 335 may be operably coupled to one or more SGSN 344. In a broadcast mode of operation, the GGSN 335 may be operably coupled to a Broadcast Multicast Service Centre (BM-SC) 347, which in turn may be operably coupled to any network, for example a shared MBMS network comprising at least one source of broadcast media 345. In a broadcast mode of operation, the GGSN 335 identifies the necessary paths for data to be routed to subscribing mobile stations, such as UE 314, as well as reserving the necessary resources to facilitate the broadcast delivery of data through the SGSN 344. The GGSN 335 also provides the SGSN 344 with the multimedia data for the requested service(s) as received from the BM-SC 347. The BM-SC 347 handles the announced services and allocates resources in a broadcast network, for example the MBMS network, through the GGSN 335. Multimedia data for the services provided is forwarded to the GGSN 335 as packetized data, for example using Internet Protocol (IP) multicast techniques. In this manner, services are announced by, and data for services are provided by, the broadcast media source 345 (sometimes referred to as a content provider).

The broadcast mode logic 350 is configured to manage the physical resources that are signaled to the RNCs and the Node Bs. In this manner, the broadcast mode logic 350 allocates resources for broadcast, sets transmit powers and allocates cell IDs, such as common cell IDs, for resources that are to carry broadcast transmissions. Thus, in an alternative example embodiment, the broadcast mode logic 350 may schedule broadcast traffic into a radio sub-frame allocated for unicast data, such that the broadcast data is sent with unicast control information, as illustrated in FIG. 5 in addition to scheduling normal unicast transmissions.

Thus, in one example, a communication unit such as a RNC 336 or NodeB 324 may support broadcast transmissions in a wireless communication system that comprises a plurality of communication cells. In one example, the RNC may comprise logic, for example RRM 341, and/or NodeB 324 may comprise logic, for example signal processing module 396, for supporting at least one broadcast transmission in at least one sub-frame of a physical resource. The at least one broadcast transmission comprises broadcast data that uses a first cell identifier; and logic for supporting transmission of unicast control information using a second cell identifier in the at least one sub-frame of the physical resource, wherein the first cell identifier is different to the second cell identifier. In one example, the first cell ID may be a common cell ID. In the same example or an alternative example, the second cell ID may be a cell-specific ID.

In one example, the RNC may comprise logic, for example RRM 341, and/or NodeB 324 may comprise logic, for example signal processing module 396, for supporting at least one time discontinuous broadcast transmission in at least one sub-frame of a radio frame of a physical resource; and for supporting transmission of unicast control information in a plurality of time-continuous sub-frames of the radio frame of the physical resource. The at least one subframe used for the at least one time discontinuous broadcast transmission comprises a first duration that is less than a second duration used in the plurality of sub-frames of the radio frame for transmitting unicast control information.

In one example, the RNC may comprise processing logic for instructing a NodeB 324 to allocate sub-frames in the aforementioned manner.

In one example, the NodeB may comprise processing logic for allocating sub-frames in the aforementioned manner and thereafter broadcasting data and transmitting unicast control information to one or more UEs.

In one example embodiment, an insertion of broadcast data may be performed in a static manner. For example, an OMC may configure the RNC to always allocate the same one or more specified sub-frames for use in replacing unicast data with broadcast data. Thus, OMC 346 may comprise logic for configuring RNC 340 to allocate at least one sub-frame of a physical resource for supporting at least one broadcast transmission and supporting transmission of unicast control information n the aforementioned manner.

In one example embodiment, an insertion of broadcast data may be performed in a dynamic manner. For example, the RNC 340 or Node B 324 may be configured to dynamically allocate one or more particular sub-frames for use in replacing unicast data with broadcast data, for example dependent upon whether or not UEs in the cell (or cells) require broadcast data. If the UEs or cells do not require broadcast data, or no longer require broadcast data, then the one or more broadcast sub-frames may be assigned back to supporting unicast communication.

When considering the design of cellular broadcast systems, it is beneficial to consider also the degree of harmonisation that may be achieved between broadcast and unicast transmission modes. Broadcast and unicast transmission modes have different optimisation criteria, yet it is beneficial if both are able to utilise a similar underlying framework for the radio communication.

The inventors of the present invention have recognised that unicast technology in WCDMA, called high speed downlink packet access (HSDPA), has a short code component and utilises short transmission time periods (using 2 msec. sub-frames) for unicast data. More information on HSDPA can be found in the 3GPP technical standard: TS25.211. These transmissions, utilising short code components and short transmission time periods, may also be mixed (using code multiplexing) with a long code component and long transmission times (or continuous transmission) for control, pilot and also for other user data.

In accordance with one example embodiment, it is proposed that the short code component and short transmission times used for unicast data in HSDPA are replaced with similar short code component and short transmission times for broadcast purposes. The benefits of this approach are several fold. For example, a high degree of technology reuse is possible in the UE handset and NodeB, since similar technology (hardware, firmware and/or software) can be used for both unicast and broadcast.

In addition, in one example embodiment of the invention, a long transmission time interval may be constructed using a plurality of discontinuous shorter 2 msec sub-frames dedicated for broadcast data (in replacing the HSDPA unicast data). To receive the broadcast transmission the broadcast receiver is then only turned 'ON' for a fraction of time, thus saving battery power. This may provide more efficient power saving operation in a Discontinuous Reception (DRX) mode. This ability to time-multiplex broadcast services allows for different groups of transmitters to participate in a particular single frequency network (SFN) broadcast service transmission at different times, thereby enabling a subsequent variation in the coverage area provided for each signal frequency network (SFN) service. An SFN service area is generally referred to as an "SFN zone". An SFN broadcast transmission is one in which participating base stations transmit the same data content and same signal waveform at the same time, using a common cell ID across all broadcast communication cells. In CDMA SFN systems, this requires that each NodeB uses the same scrambling sequence for the active time duration of the SFN service.

Figure 4:
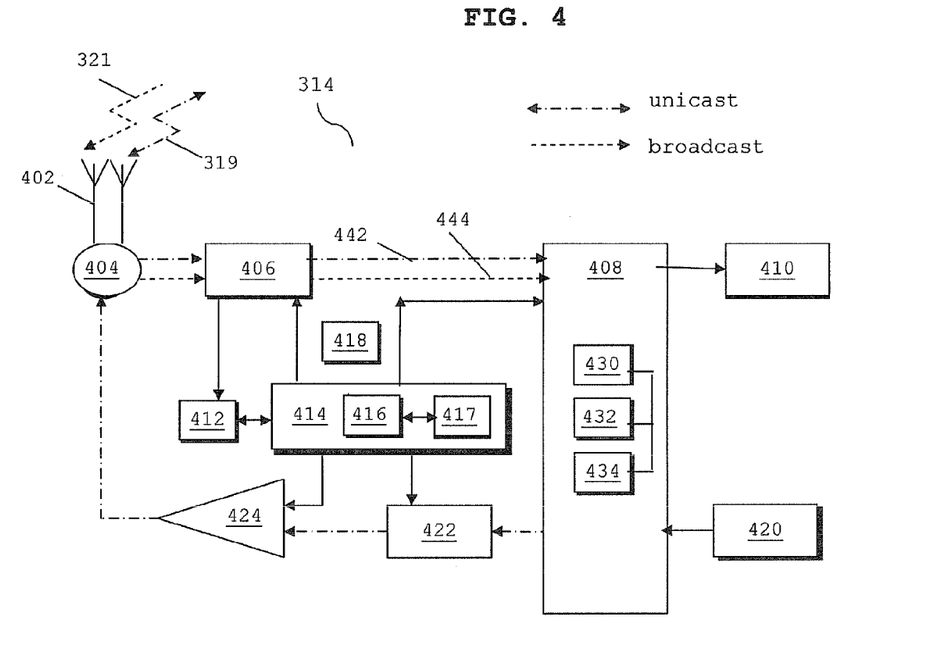
FIG. 4 illustrates a wireless communication unit, such as a user equipment (UE) or a NodeB, adapted in accordance with some example embodiments of the invention.

Referring now to FIG. 4, a block diagram of a wireless communication unit 314, adapted in accordance with some example embodiments of the invention, is shown. In practice, purely for the purposes of explaining embodiments of the invention, the wireless communication unit is described in terms of a user equipment (UE). The wireless communication unit 314 contains an antenna, an antenna array 402, or a plurality of antennae, coupled to antenna switch 404 that provides isolation between receive and transmit chains within the wireless communication unit 314. One or more receiver chains, as known in the art, include receiver front-end circuitry 406 (effectively providing reception, filtering and intermediate or base-band frequency conversion). The receiver front-end circuitry 406 is coupled to a signal processing module 408. An output from the signal processing module 408 is provided to a suitable output device 410, such as a screen or display. The one or more receiver chain(s) is/are operably configured to receive a data packet stream in one or more sub-frames over a unicast network or receive a data packet stream in one or more sub-frames a broadcast network. In one example embodiment, separate receiver chains (not shown) are used for broadcast and unicast reception. A skilled artisan will appreciate that the level of integration of using receiver circuits or components may be implementation-dependent, but may be separate up to, say, a video decoder.

A controller 414 maintains overall operational control of the wireless communication unit 314. The controller 414 is also coupled to the receiver front-end circuitry 406 and the signal processing module 408 (generally realised by a digital signal processor (DSP)). The controller 414 is also coupled to a buffer module 417 and a memory device 416 that selectively stores operating regimes, such as decoding/encoding functions, synchronisation patterns, code sequences, and the like. A timer 418 is operably coupled to the controller 414 to control the timing of operations (transmission or reception of time-dependent signals) within the wireless communication unit 314.

As regards the transmit chain, this essentially includes an input device 420, such as a keypad, coupled in series through transmitter/modulation circuitry 422 and a power amplifier 424 to the antenna, antenna array 402, or plurality of antennae. The transmitter/modulation circuitry 422 and the power amplifier 424 are operationally responsive to the controller 414. The transmit chain is operably configured to transmit a data packet stream over the bi-directional unicast network.

The signal processor module 408 in the transmit chain may be implemented as distinct from the signal processor in the receive chain. Alternatively, a single processor may be used to implement a processing of both transmit and receive signals, as shown in FIG. 4. Clearly, the various components within the wireless communication unit 314 can be realized in discrete or integrated component form, with an ultimate structure therefore being an application-specific or design selection.

In one example, a communication unit such as a UE 341 may support broadcast transmissions in a wireless communication system that comprises a plurality of communication cells. In one example, the UE may comprise signal processing module 408 for supporting, for example by receiving, at least one broadcast transmission in at least one sub-frame of a physical resource. The at least one broadcast transmission comprises broadcast data that uses a first cell identifier; and logic for supporting transmission of unicast control information using a second cell identifier in the at least one sub-frame of the physical resource, wherein the first cell identifier is different to the second cell identifier.

In one example, the communication unit, such as UE 341, may support broadcast transmissions in a wireless communication system that comprises a plurality of communication cells. In one example, the UE may comprise signal processing module 408 for supporting, for example by receiving, at least one time discontinuous broadcast transmission in at least one sub-frame of a radio frame of a physical resource; and for supporting transmission of unicast control information in a plurality of time-continuous sub-frames of the radio frame of the physical resource. The at least one subframe used for the at least one time discontinuous broadcast transmission comprises a first duration that is less than a second duration used in the plurality of sub-frames of the radio frame for transmitting unicast control information.

In accordance with example embodiments of the invention, the signal processor module 408 has been adapted to comprise logic 430 (encompassing hardware, firmware or software) to determine whether a broadcast or uni-directional unicast communication is being received in the streamed 2 msec sub-frame data on one of the unicast carriers carrying broadcast content. In one example, the signal processor module 408 also comprises decoder 432 configured to decode unicast traffic, broadcast traffic or a combination of both unicast traffic and broadcast traffic, for example following receipt of content in a frame structure as illustrated in FIG. 5. In one example, the signal processor module 408 also comprises logic 434, to facilitate joint error recovery when receiving both broadcast and unicast communication.

From FIG. 2 we note that the signal-to-noise ratio (SNR) may be provided by $$SNR_{SFN} = \frac{C}{N}$$

where:

C is the composite received SFN signal after combining, and

N is the residual interference plus thermal noise.

However, for the radio frame structure of FIG. 5 the SNR is given by $$SNR'_{SFN} = \frac{C}{N + I_{UC}(1-\alpha)}$$

where:

$I_{UC}$ is the interference from the unicast control channels on the broadcast data as per FIG. 5, and $\alpha$ is an interference suppression term, $0 <= \alpha <= 1$.

Examples for suppressing $I_{UC}$ may include, one or more of;

(i) Interference cancellation, at the UE, use of signal processing algorithms to reconstruct the unicast control channels and subtract from the received waveform.

(ii) Sequence selection performed by the Node B, the portion of the unicast control channels that are time coincident with the broadcast data, i.e. broadcast sub-frame, have different sequence properties to ensure pseudo orthogonality and hence increases $\alpha$.

(iii) Power Control at the Node B across the broadcast/unicast control channel subframe, where the power of the unicast control channels is attenuated by an amount that maintains the integrity of the control channel information, but at the same time increases $\alpha$. In this example we would rely upon the channel coding of the unicast control channels to overcome the attenuation.

Reuse of HSDPA short codes, short transmission times and discontinuous transmission enable the reuse of unicast transceiver technology in a broadcast transmission. Embodiments of the invention propose a system that may be suitable for implementation in a multicast/broadcast single frequency network (MBSFN) transmission in paired frequency bands.

Embodiments of the invention aim to achieve maximal reuse of WCDMA principles, whilst accommodating the aforementioned concepts that aim to reduce complexity and cost for broadcast systems, whilst simultaneously improving performance.

The system employed in embodiments of the invention is based on at least one of the following:

(i) Use of receiver structures with dual receive antennas and chip-level equalisation, commonly known as "type-3" FDD HSDPA receiver principles;

(ii) Adoption of the 2 msec sub-frame structure as used for FDD HSDPA;

(iii) Use of spreading factor (SF) SF16 for S-SCCPCH where possible (aligned with FDD HSDPA), noting that in FDD MBMS this is SF256, SF128, SF64, SF32, SF16, SF8, SF4, where transmission is continuous;

(iv) Use of unicast control channels during the broadcast sub-frame; and (v) Use of FDD chip-level scrambling sequences.

For SFN transmission, wherein multiple cells transmit the same waveform, a corresponding plurality of copies of the transmitted signal are present at the UE receiver but each with differing time delays and amplitudes and phases due to their passage through the respective radio propagation channels and reflection/refraction due to intervening physical objects. These are observed by the UE receiver as a single transmission source received over a single complex radio propagation channel environment comprising the multiple delays. The extent in time between the first and last arrival of these signal paths is commonly referred to as the delay spread of the channel. For SFN broadcast deployments, the delay spread can therefore be significantly larger than observed for unicast deployments.

In one example, the signal processor module 408 of the UE receiver has the capability, during the subframe carrying unicast control channels and broadcast data, to receive the larger spread of delays from the SFN broadcast transmission as well as the smaller spread of delays from the unicast control channel transmission. It will be understood that, in one example, the UE 314 would receive the broadcast data and unicast control channels that share the same sub-frame simultaneously using a common RF receiver. After conversion from the analog domain to the digital domain, demultiplexing of the broadcast and unicast may be effected by signal processor module 408. In one example, the signal processor module 408 may, or may not, treat the broadcast data differently to unicast control data. For example, if the spread of delays is greater for broadcast, then the signal processor module 408 may treat the broadcast transmission differently using different signal processing algorithms.

Referring now to FIG. 5, a framing format 500 as adapted according to embodiments of the invention, is illustrated. Embodiments of the invention propose that the same HSDPA-like 2 msec. sub-frame structure used to support unicast data is additionally used to support broadcast FDD MBMS data. Thus, broadcast FDD MBMS data may be TDM multiplexed with other WCDMA downlink physical channels carrying unicast data, within the FDD bands, whereby the control channels maintain use of unicast characteristics, such as individual cell IDs.

In this example, FIG. 5 illustrates a unicast radio framing/timing structure 500 comprising 2 msec. sub-frames of unicast data 505. In one or more of the 2 msec. sub-frames, the unicast data is replaced with broadcast FDD MBMS data 510. The radio framing/timing structure 500 also has a 10 msec radio frame 520 comprising unicast control channels 515. As such, a mixture of unicast data and broadcast data can be transmitted on the same frequency carrier, with each broadcast sub-frame using a broadcast scrambling code and, in one example, a first (e.g. common) cell ID. Each unicast sub-frame uses a separate unicast scrambling code and a second (e.g. cell-specific) ID that is not a common cell ID used for the transmission of broadcast data. Notably, the unicast control channels that use cell-specific IDs accompanies the broadcast data that uses the common cell ID.

In one example, as illustrated in FIG. 5, the broadcast data is sent in at least one time discontinuous broadcast transmission in at least one sub-frame of a radio frame of a physical resource, such as the carrier frequency employed for unicast communication. Transmission of unicast control information utilises a plurality of time-continuous sub-frames of the radio frame of the physical resource. The at least one subframe used for the at least one time discontinuous broadcast transmission comprises a first duration that is less than a second duration used in the plurality of sub-frames of the radio frame for transmitting unicast control information.

In unicast communications, such as high-speed downlink packet access (HSDPA) or high-speed uplink packet access (HSUPA), there exists a relationship between the traffic channels carrying data and their associated control channels. Example embodiments of the present invention may provide a benefit in preserving the unicast control channels when replacing a unicast data transmission within a subframe with a broadcast data transmission. A further benefit may result from maintaining optimum/maximum throughput on the unicast traffic channels. Through the coexistence of both broadcast data and unicast control information within the same sub-frame it may be possible to simultaneously satisfy both broadcast and unicast requirements. In one example embodiment of the invention, the broadcast data may use a common cell ID and the unicast control channels may use a cell-specific ID. In another example embodiment, a portion of the unicast control channel that is time coincident with the broadcast transmission may be subject to modification, either through changes in sequence properties or power attenuation.

By including such a time-domain-multiplexing component to the radio framing structure for the various data only channels, whilst maintaining the unicast control channels, this approach may serve either or both of the following purposes:

(i) Efficient DRX (reduced receiver on time) and, hence, lower power consumption, thereby extending battery life.

(ii) Reduced UE complexity/cost due to the replacement of transmission time interval (TTI) DRX with intra-frame DRX.

A TTI DRX is where a whole TTI is received, then "N" subsequent TTIs are not received. The transmitter operates in the same manner. This means that the volume of data contained within a TTI {i.e. the active one} needs to be (N+1) times larger than the volume per TTI required to achieve the mean desired bit rate for the service.

DRX schemes that operate on a sub-TTI level (e.g. slot or sub-frame based), can implement the same 1:N (on:off) ratio. However, because every TTI is active, the volume of data shipped per TTI remains equal to only 1× the volume per TTI required to achieve the mean desired bit rate for the service. Thus, the complexity of the receiver processing may be reduced as the data volumes it needs to handle per TTI are reduced.

In one example, different scrambling sequences may be used per S-CCPCH 2 msec sub-frame to enable support for multiple time-multiplexed SFN zones. In one example, different data modulation techniques may be applied, including those commonly known in the art, such as QPSK and 16-QAM. Modulation schemes for P-CCPCH, S-CCPCH and MICH may not be changed from the current specifications.

It is envisaged in one example embodiment of the invention that other complementary techniques that exist in current standards could be readily used in conjunction with the proposed techniques, for example existing techniques of channel coding, spreading and other procedures from the existing 3GPP™ FDD or TDD specifications.

One benefit of the aforementioned techniques is to minimise the impact of the physical layer features of the invention with respect to the higher layers. The principles of MBSFN mobility and user plane and control plane architectures may correspond to those in existing FDD or TDD MBSFN systems. Modifications could be envisaged that achieve one or more of the above benefits and involve the radio resource control (RRC) layer and NodeB Application Protocol (NBAP) configuration in order to accommodate some parameters of specific relevance to the physical layer. Thus, advantageously, no modification to the core network and associated services/applications are required to achieve the aims of the aforementioned embodiments.

At the physical layer, the aforementioned concepts are intended to make use of current HSDPA type-3 receivers with associated modifications to support efficient broadcast.

Figure 6:
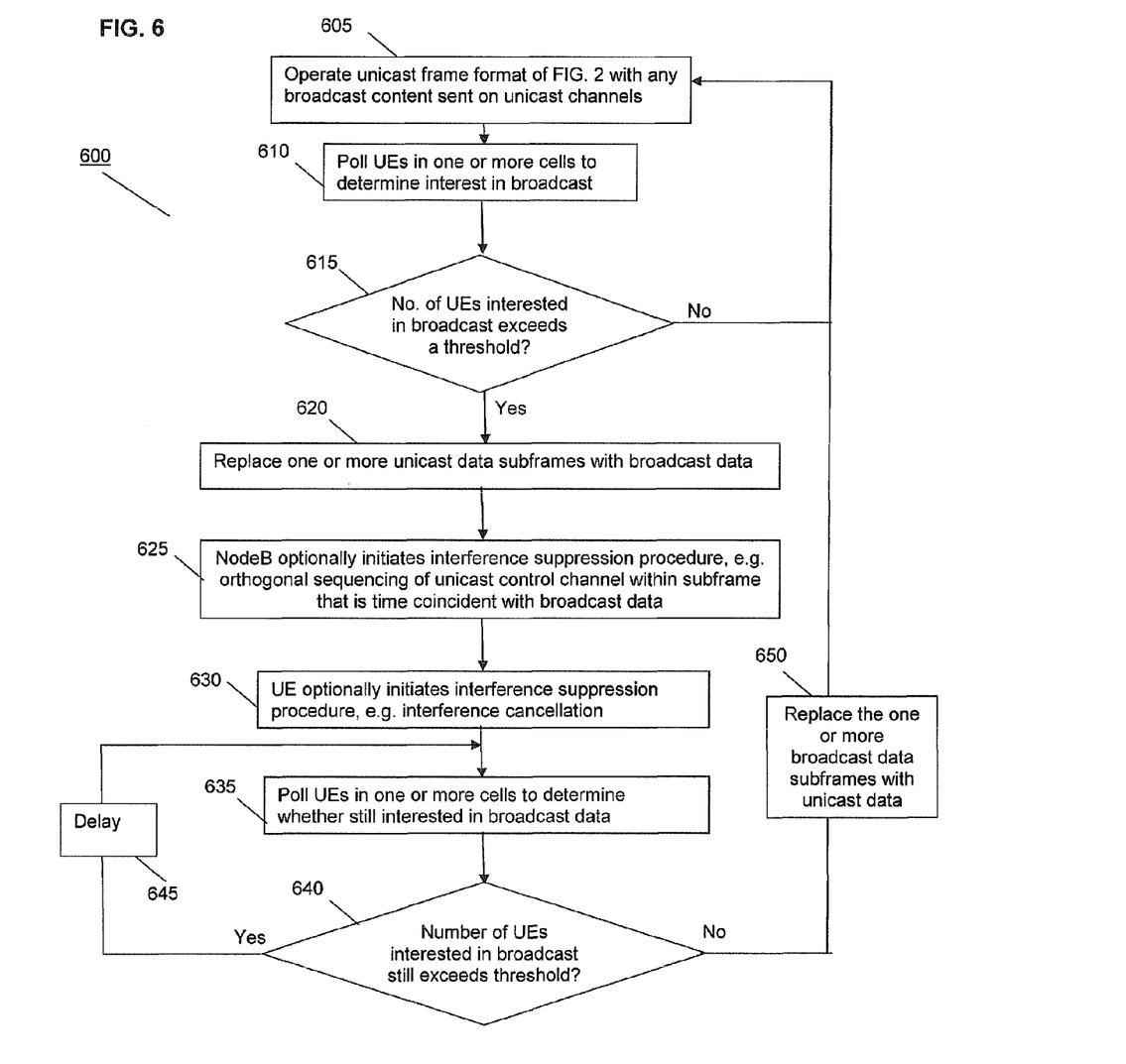
FIG. 6 illustrates an example of a flowchart to support broadcast communication.

Referring now to FIG. 6, an example of a flowchart 600 to support broadcast communication is illustrated. The flowchart 600 starts with the wireless communication system that comprises a plurality of communication cells operating with a unicast frame format/structure, for example substantially as indicated in FIG. 2. In this context, when the wireless communication system supports both broadcast communication and unicast communication, broadcast content is sent on one or more unicast channels, as shown in step 605. A network element, such as RRM logic 341 of the RNC 336 of FIG. 3 polls the UEs in one or more communication cells to determine a level of interest in receiving broadcast communication, as in step 610. A determination is then made as to whether sufficient interest exists to adapt the unicast frame format/structure, for example by comparing the determined number of UEs interested in receiving broadcast content with a threshold number, as shown in step 615. If an insufficient number of UEs is interested in receiving broadcast content in step 615, for example the number is less than the threshold number, the flowchart loops back to step 605. If a sufficient number of UEs is interested in receiving broadcast content in step 615, for example the number is greater than or equal to the threshold number, the flowchart progresses to step 620 where one or more of the unicast data subframes is/are replaced with broadcast data, for example in accordance with the structure of FIG. 5.

In one example, a NodeB may optionally initiate an interference suppression procedure, for example by selecting an orthogonal sequence of unicast control channel information within the subframe that is time coincident with the broadcast data content, as shown in step 625. In one example, a UE may optionally initiate an interference suppression procedure, for example by selecting an interference cancellation algorithm to apply to received data content, as shown in step 630.

At a subsequent time, the network element, such as RRM logic 341 of the RNC 336 of FIG. 3, then polls the UEs in one or more communication cells again to determine the level of interest in receiving broadcast communication, as in step 635. A determination is then made as to whether sufficient interest still exists to maintain the unicast/broadcast frame format/structure of FIG. 5, for example by comparing the determined number of UEs interested in receiving broadcast content with the threshold number, as shown in step 640. If a sufficient number of UEs is interested in receiving broadcast content in step 640, for example the number remains greater than or equal to the threshold number, the flowchart continues to loop to step 635, incorporating a delay 645, to ensure use of the broadcast content within the frame structure is merited. If an insufficient number of UEs is now interested in receiving broadcast content in step 640, for example the number is less than the threshold number, the flowchart progresses to step 650 where one or more of the broadcast data subframes is/are replaced with unicast data, and the flowchart loops back to step 605.

Although the aforementioned example of determining a level of UE interest in broadcast content, and comparing a determined number with a threshold number, has been described to initiate activation or de-activation of broadcast content within a predominantly unicast frame structure, it is envisaged that other mechanisms can be used. For example, a start of a major sporting event may be assumed to have sufficient broadcast interest from supported UEs, without necessitating a polling operation. In this example, a broadcast/unicast frame structure may be unilaterally adopted by the RNC or NodeB.

Figure 7:
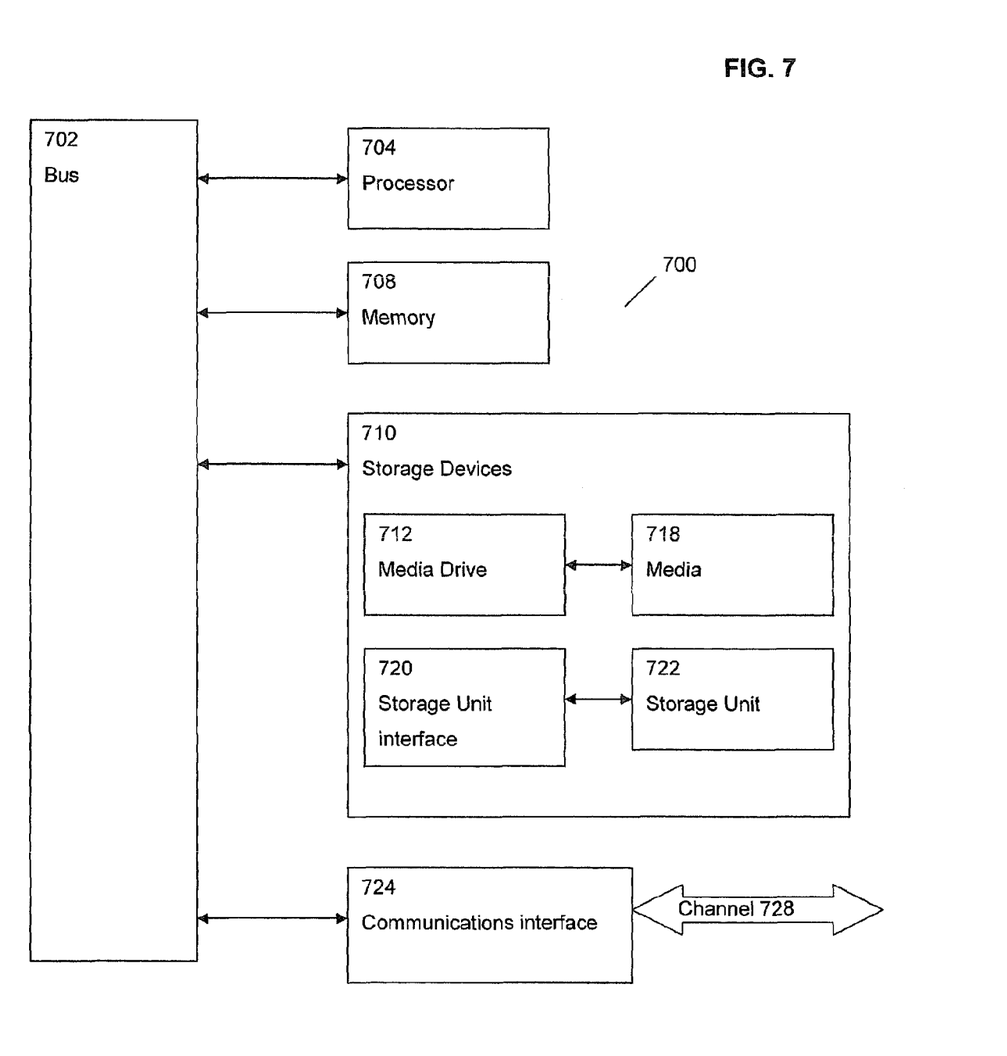
FIG. 7 illustrates a typical computing system that may be employed to implement signal processing functionality in embodiments of the invention.

Referring now to FIG. 7, there is illustrated a typical computing system 700 that may be employed to implement signal processing functionality in embodiments of the invention. Computing systems of this type may be used in access points and wireless communication units. Those skilled in the relevant art will also recognize how to implement the invention using other computer systems or architectures. Computing system 700 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 700 can include one or more processors, such as a processor 704. Processor 704 can be implemented using a general or special-purpose processing engine such as, for example, a microprocessor, microcontroller or other control logic. In this example, processor 704 is connected to a bus 702 or other communications medium.

Computing system 700 can also include a main memory 708, such as random access memory (RAM) or other dynamic memory, for storing information and instructions to be executed by processor 704. Main memory 708 also may be used for storing temporary variables or other intermediate information during execution of instructions to be executed by processor 704. Computing system 700 may likewise include a read only memory (ROM) or other static storage device coupled to bus 702 for storing static information and instructions for processor 704.

The computing system 700 may also include information storage system 710, which may include, for example, a media drive 712 and a removable storage interface 720. The media drive 712 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 718 may include, for example, a hard disk, floppy disk, magnetic tape, optical disk, CD or DVD, or other fixed or removable medium that is read by and written to by media drive 712. As these examples illustrate, the storage media 718 may include a computer-readable storage medium having particular computer software or data stored therein.

In alternative embodiments, information storage system 710 may include other similar components for allowing computer programs or other instructions or data to be loaded into computing system 700. Such components may include, for example, a removable storage unit 722 and an interface 720, such as a program cartridge and cartridge interface, a removable memory (for example, a flash memory or other removable memory module) and memory slot, and other removable storage units 722 and interfaces 720 that allow software and data to be transferred from the removable storage unit 718 to computing system 700.

Computing system 700 can also include a communications interface 724. Communications interface 724 can be used to allow software and data to be transferred between computing system 700 and external devices. Examples of communications interface 724 can include a modem, a network interface (such as an Ethernet or other NIC card), a communications port (such as for example, a universal serial bus (USB) port), a PCMCIA slot and card, etc. Software and data transferred via communications interface 724 are in the form of signals which can be electronic, electromagnetic, and optical or other signals capable of being received by communications interface 724. These signals are provided to communications interface 724 via a channel 728. This channel 728 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product' 'computer-readable medium' and the like may be used generally to refer to media such as, for example, memory 708, storage device 718, or storage unit 722. These and other forms of computer-readable media may store one or more instructions for use by processor 704, to cause the processor to perform specified operations. Such instructions, generally referred to as 'computer program code' (which may be grouped in the form of computer programs or other groupings), when executed, enable the computing system 700 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 700 using, for example, removable storage drive 722, drive 712 or communications interface 724. The control logic (in this example, software instructions or computer program code), when executed by the processor 704, causes the processor 704 to perform the functions of the invention as described herein.

In one example, a tangible non-transistory computer program product comprises executable program code for supporting broadcast transmissions in a wireless communication system. The executable program code may be operable for, when executed in at least one from a group consisting of: a radio network controller (RNC), a radio resource manager (RRM), a base station, a wireless subscriber communication unit: supporting at least one broadcast transmission in at least one sub-frame of a physical resource, wherein the at least one broadcast transmission comprises broadcast data that uses a first (e.g. common) cell identifier; and supporting transmission of unicast control information using a second cell identifier in the at least one sub-frame of the physical resource, wherein the first cell identifier is different to the second cell identifier.

In one example, a tangible non-transistory computer program product comprises executable program code for supporting broadcast transmissions in a wireless communication system. The executable program code may be operable for, when executed in at least one from a group consisting of: a radio network controller (RNC), a radio resource manager (RRM), a base station, a wireless subscriber communication unit: supporting at least one time discontinuous broadcast transmission in at least one sub-frame of a radio frame of a physical resource; and supporting transmission of unicast control information in a plurality of time-continuous sub-frames of the radio frame of the physical resource; wherein the at least one subframe used for the at least one time discontinuous broadcast transmission comprises a first duration that is less than a second duration used in the plurality of sub-frames of the radio frame for transmitting unicast control information.

It will be appreciated that, for clarity purposes, the above description has described embodiments of the invention with reference to different functional units and processors. However, it will be apparent that any suitable distribution of functionality between different functional units or processors, for example with respect to the broadcast mode logic or management logic, may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors. Thus, the elements and components of an embodiment of the invention may be physically, functionally and logically implemented in any suitable way. Indeed, the functionality may be implemented in a single unit, in a plurality of units or as part of other functional units.

Those skilled in the art will recognize that the functional blocks and/or logic elements herein described may be implemented in an integrated circuit for incorporation into one or more of the communication units. Furthermore, it is intended that boundaries between logic blocks are merely illustrative and that alternative embodiments may merge logic blocks or circuit elements or impose an alternate composition of functionality upon various logic blocks or circuit elements. It is further intended that the architectures depicted herein are merely exemplary, and that in fact many other architectures can be implemented that achieve the same functionality. For example, for clarity the signal processing module 480 has been illustrated and described as a single processing module, whereas in other implementations it may comprise separate processing modules or logic blocks.

Although the present invention has been described in connection with some example embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to "a", "an", "first", "second" etc. do not preclude a plurality.

The invention claimed is:

1. A method for supporting broadcast and unicast transmission in a wireless communication system that comprises a plurality of communication cells, the method comprising:
   generating, by a communication device, a radio frame in a physical resource, the radio frame including a plurality of unicast sub-frames that use a first cell identifier; and
   replacing, by the communication device, one of the unicast sub-frames in the radio frame with a broadcast sub-frame that uses a second cell identifier, the remaining unicast sub-frames of the plurality of unicast sub-frames including unicast control information, wherein the first cell identifier is different to the second cell identifier.

2. The method of claim 1, further comprising transmitting the radio frame, wherein the transmitting includes
- transmitting a time discontinuous broadcast transmission of the broadcast sub-frame; and
- transmitting a plurality of time-continuous unicast sub-frames including the unicast control information.

3. The method of claim 2 wherein
- the broadcast sub-frame is of a first duration, and
- the unicast sub-frames are of a second duration that is greater than the first duration.

4. The method of claim 2, further comprising transmitting unicast data in at least one of the plurality of time-continuous unicast sub-frames.

5. The method of claim 4, wherein the unicast data is encoded using the first cell identifier.

6. The method of claim 1, wherein the first cell identifier is a common cell identifier and the second cell identifier are each a cell-specific identifier.

7. A method for supporting broadcast and unicast transmission in a wireless communication system that comprises a plurality of communication cells, the method comprising:
- generating, by a communication device, a radio frame in a physical resource, the radio frame including a plurality of time-continuous unicast sub-frames and a time-discontinuous broadcast sub-frame;
- replacing, by the communication device, one of the time-continuous unicast sub-frames in the radio frame with a broadcast sub-frame that uses a first cell identifier;
- transmitting broadcast data in the time discontinuous broadcast sub-frame; and
- transmitting unicast control information in the remaining time-continuous unicast sub-frames of the plurality of time-continuous unicast sub-frames, wherein
- the time-discontinuous broadcast sub-frame is of a first duration, and
- each sub-frame of the plurality of time-continuous unicast sub-frames is of a second duration that is greater than the first duration.

8. The method of claim 7, wherein transmitting the unicast control information comprises transmitting at least one unicast control channel for the unicast control information.

9. The method of claim 7, wherein the transmitting the time broadcast data comprises selecting a sub-frame of the physical resource for the time-discontinuous broadcast sub-frame in at least one of a dynamic manner or a static manner.

10. The method of claim 7, wherein the physical resource comprises a same downlink carrier frequency.

11. The method of claim 7, further comprising initiating interference suppression upon transmitting the time-discontinuous broadcast sub-frame in at least one sub-frame of the physical resource.

12. The method of claim 11, wherein initiating the interference suppression comprises at least one of:
(i) applying interference cancellation to re-construct the unicast control information from a received waveform;
(ii) selecting a code sequence selection to be used in transmitting the unicast control information that is time coincident with the broadcast data; and
(iii) applying power control across the transmission of broadcast data and unicast control information in the at least one sub-frame.

13. The method of claim 7, wherein the wireless communication system supports at least one of unicast high speed downlink packet access (HSDPA) and/or integrated mobile broadcast.

14. The method of claim 7, wherein the transmitting the broadcast data comprises selectively inserting broadcast data that uses a second cell identifier into the at least one time-continuous unicast sub-frame to replace a content of the at least one time-continuous unicast sub-frame.

15. The method of claim 7, wherein the transmitting the broadcast data and the transmitting the unicast control information is performed in at least one of a radio network controller (RNC), a radio resource manager (RRM), a base station, and/or a wireless subscriber communication unit.

16. A non-transitory computer readable medium storing computer executable program code for supporting broadcast and unicast transmissions in a wireless communication system, the computer executable program code, when executed by a communication device, causes the communication device to:
- generate a radio frame in a physical resource, the radio frame including a plurality of unicast sub-frames that use a first cell identifier; and
- replace one of the unicast sub-frames in the radio frame with a broadcast sub-frame that uses a second cell identifier, the remaining unicast sub-frames of the plurality of unicast sub-frames including unicast control information, wherein
- the first cell identifier is different to the second cell identifier.

17. A non-transitory computer readable medium storing computer executable program code for supporting broadcast and unicast transmissions in a wireless communication system, the computer executable program code, when executed by a communication device, causes the communication device to:
- generate a radio frame in a physical resource, the radio frame including a plurality of time-continuous unicast sub-frames and a time-discontinuous broadcast sub-frame;
- replace one of the time-continuous unicast sub-frames in the radio frame with a broadcast sub-frame that uses a first cell identifier;
- transmit broadcast data in the time discontinuous broadcast sub-frame; and
- transmit unicast control information in the remaining time-continuous unicast sub-frames of the plurality of time-continuous unicast sub-frames, wherein
- the time-discontinuous broadcast sub-frame is of a first duration, and
- each sub-frame of the plurality of time-continuous unicast sub-frames is of a second duration that is greater than the first duration.

18. A communication device for supporting broadcast and unicast transmissions in a wireless communication system that comprises a plurality of communication cells, the communication device comprising:
circuitry configured to
- generate a radio frame in a physical resource, the radio frame including a plurality of unicast sub-frames that use a first cell identifier; and
- replace one of the unicast sub-frames in the radio frame with a broadcast sub-frame that uses a second cell identifier, the remaining unicast sub-frames of the plurality of unicast sub-frames including unicast control information, wherein
- the first cell identifier is different to the second cell identifier.

19. A communication device for supporting broadcast and unicast transmissions in a wireless communication system that comprises a plurality of communication cells, the communication device comprising:

circuitry configured to
  generate a radio frame in a physical resource, the radio frame including a plurality of time-continuous unicast sub-frames and a time-discontinuous broadcast sub-frame;
  replace one of the time-continuous unicast sub-frames in the radio frame with a broadcast sub-frame that uses a first cell identifier;
  transmit broadcast data in the time-discontinuous broadcast sub-frame; and
  transmit unicast control information in the remaining time-continuous unicast sub-frames of the plurality of time-continuous unicast sub-frames, wherein
the time-discontinuous broadcast sub-frame is of a first duration, and
each sub-frame of the plurality of time-continuous unicast sub-frames is of a second duration that is greater than the first duration.

20. The communication device of claim 18, wherein the communication device is one of a radio network controller (RNC), a radio resource manager (RRM), a base station, and/or a wireless subscriber communication unit.

21. An integrated circuit for a communication device for supporting broadcast and unicast transmissions in a wireless communication system that comprises a plurality of communication cells, the integrated circuit comprising:
  circuitry configured to
    generate a radio frame in a physical resource, the radio frame including a plurality of unicast sub-frames that use a first cell identifier; and
    replace one of the unicast sub-frames in the radio frame with a broadcast sub-frame that uses a second cell identifier, the remaining unicast sub-frames of the plurality of unicast sub-frames including unicast control information, wherein
the first cell identifier is different to the second cell identifier.

22. An integrated circuit for a communication device for supporting broadcast and unicast transmissions in a wireless communication system that comprises a plurality of communication cells, the integrated circuit comprising:
  circuitry configured to
    generate a radio frame in a physical resource, the radio frame including a plurality of time-continuous unicast sub-frames and a time-discontinuous broadcast sub-frame;
    replace one of the time-continuous unicast sub-frames in the radio frame with a broadcast sub-frame that uses a first cell identifier;
    transmit broadcast data in the time-discontinuous broadcast sub-frame; and
    transmit unicast control information in the remaining time-continuous unicast sub-frames of the plurality of time-continuous unicast sub-frames, wherein
the time-discontinuous broadcast sub-frame is of a first duration, and
each sub-frame of the plurality of time-continuous unicast sub-frames is of a second duration that is greater than the first duration.

23. An Operations and Management Centre comprising:
  circuitry configured to execute logic for configuring a radio network controller to transmit at least one broadcast sub-frame and transmit unicast control information in accordance with claim 1.

* * * * *